(12) United States Patent
Manvi

(10) Patent No.: US 7,814,541 B1
(45) Date of Patent: Oct. 12, 2010

(54) VIRTUAL ROUTING FOR VIRTUAL LOCAL AREA NETWORKS HAVING OVERLAPPING IP ADDRESSES

(75) Inventor: Rajendra Manvi, Sunnyvale, CA (US)

(73) Assignee: Array Networks, Inc., Milpitas, CA (US)

( * ) Notice: Subject to any disclaimer, the term of this patent is extended or adjusted under 35 U.S.C. 154(b) by 1092 days.

(21) Appl. No.: 11/437,453

(22) Filed: May 19, 2006

(51) Int. Cl.
*G06F 9/00* (2006.01)
*H04L 29/06* (2006.01)

(52) U.S. Cl. .......................... 726/15; 726/13; 713/154
(58) Field of Classification Search .................. 726/15, 726/13; 713/154
See application file for complete search history.

(56) References Cited

U.S. PATENT DOCUMENTS

| | | | |
|---|---|---|---|
| 6,948,003 B1 * | 9/2005 | Newman et al. | 709/250 |
| 7,213,108 B2 * | 5/2007 | Ozaki | 711/129 |
| 7,298,742 B2 * | 11/2007 | Chuang | 370/389 |
| 7,334,049 B1 * | 2/2008 | Somasundaram et al. | 709/245 |
| 2003/0135578 A1 * | 7/2003 | Banga et al. | 709/215 |
| 2004/0066788 A1 * | 4/2004 | Lin et al. | 370/401 |

* cited by examiner

*Primary Examiner*—Nasser Moazzami
*Assistant Examiner*—Mohammad W Reza
(74) *Attorney, Agent, or Firm*—Buchanan Ingersoll & Rooney PC

(57) ABSTRACT

A method of virtual routing an overlapping IP address using a virtual private network (VPN) device connected to a virtual private network (VLAN). The method comprises the step of receiving an overlapping Internet protocol (IP) address from a virtual site, the overlapping IP address having a virtual site address tag (Vsite) associated with a client. The overlapping IP address is converted into a non-overlapping IP address. The non-overlapping IP address is then converted into an overlapping IP address having a virtual local area network (Vlan) tag, wherein the virtual local are network tag (Vlan) is associated with at least one local area network (LAN) within the virtual private network.

10 Claims, 5 Drawing Sheets

US 7,814,541 B1

VIRTUAL ROUTING FOR VIRTUAL LOCAL AREA NETWORKS HAVING OVERLAPPING IP ADDRESSES

FIELD OF THE INVENTION

This invention generally relates to a system and method of virtual routing using virtual local area networks (VLAN) and Network Address Translation (NAT) for virtual private network (VPN) devices, and more particularly a system and method of converting an overlapping IP address into a non-overlapping IP address without affecting the Internet protocols (IP) within the VPN gateway or device.

BACKGROUND

One of the most utilized networks for interconnecting distributed computer systems is the Internet. The Internet allows user of computer systems to exchange data throughout the world. In addition, many private networks in the form of corporate or commercial networks are connected to the Internet. These private networks are typically referred to as an "intranet." To facilitate data exchange, the intranet generally uses the same communications protocols as the Internet. These Internet protocols (IP) dictate how data is formatted and communicated. In addition, access to corporate networks or intranets can be controlled by network gateways, which can include a multi-layer SSL firewall system. The multi-layer SSL firewall system includes a networking architecture where the flow (associated streams of packets) is inspected both to and from the corporate network. The multi-layer SSL firewall systems are often referred to as a virtual private network (VPN) gateway, such as those sold by Array Networks of Milpitas, Calif.

As the popularity of the Internet grew, businesses turned to it as a means of extending their own networks. First came the intranet, which was a password-protected site designed for use only by company employees. Now, many companies are creating their own VPN (virtual private network) to accommodate the needs of remote employees and distant offices. The VPN is a generally a private network that uses a public network (usually the Internet) to connect remote sites or users together. Instead of using a dedicated, real-world connection such as a leased line, a VPN uses "virtual" connections routed through the Internet from the company's private network to the remote site or employee.

Since the Internet has grown larger than anyone ever imagined and with the explosion of the Internet and the increase in home networks and business networks, the number of available IP addresses is simply not enough. The obvious solution is to redesign the address format to allow for more possible addresses. This is being developed (called IPv6), but will take several years to implement because it requires modification of the entire infrastructure of the Internet. However, the problem has been addressed with Network Address Translation (NAT), which allows a single device, such as a router, to act as an agent between the Internet (or "public network") and a local (or "private") network. The Network Address Translation systems allow a single, unique IP address to represent an entire group of computers.

In a typical configuration, a local network uses one of the designated "private" IP address subnets (such as 192.168.x.x, 10.x.x.x or 172.16.x.x-172.31.x.x), and a router on that network has a private address (such as 192.168.0.1) in that address space. The router is also connected to the Internet with a single "public" address (known as "overloaded" NAT) or multiple "public" addresses assigned by an ISP. As traffic passes from the local network to the Internet, the source address in each packet is translated on the fly from the private addresses to the public address(es). The router tracks basic data about each active connection (particularly the destination address and port). When a reply returns to the router, it uses the connection tracking data it stored during the outbound phase to determine where on the internal network to forward the reply. In addition, the TCP or UDP client port numbers can be used to demultiplex the packets in the case of an overloaded NAT, or a IP address and port number when multiple public addresses are available, on packet return. To a system on the Internet, the router itself appears to be the source/destination for this traffic.

There are only a few designated IP address space for private addresses. They are 10.x.x.x, 192.168.x.x, 172.16.x.x-172.31.x.x. Because of this, it is very common to have same or similar private networks inside every company. Traditionally VPN gateways are only equipped to handle private networks which are unique. This means one will not be able to connect to multiple networks of an enterprise which have same IP address(es) using one SSL VPN gateway.

Another trend is to have multiple Virtual VPN gateways within one physical VPN gateway. The one physical VPN gateway device can include multiple logical devices. In addition, each logical VPN gateway can be connected to an independent private network. However, this scenario poses privacy problems on top of the duplicate or overlapped IP address problem as discussed in the previous section. Since these private networks may belong to different enterprises altogether (e.g., in case of a service provider providing services to many enterprises using one physical SSL VPN gateway and multiple logical VPN gateways within), it is highly required that the traffic from one logical unit not be seen by the other logical units and vice-a-versa.

On approach to solve virtual routing has been the running of multiple virtual machines on shared hardware. However, this approach has several limitation including that the approach is not scalable, since it is very memory and CPU hungry. Typically, as you keep adding more virtual machines you will run out of resources quickly, and it is often difficult to have a centralized control, which can enforce the virtualization policy across the virtual machines. In addition, running multiple instances of Network Protocol stacks has been considered by some to be a better option, however, memory scalability is still an issue, and this approach requires very involved changes in the Operating System (OS) core to achieve the solution.

Thus, it can be appreciated that a system and method of converting an overlapping IP address into a non-overlapping or unique IP address without affecting Internet protocols within a VPN device as described herein can provide significant advantages over other virtualization solutions. Accordingly, it would be desirable to convert the overlapping IP address space of the private networks to a non-overlapping unique IP address space. The non unique IP address(es) space is then used within the VPN gateway (i.e., Array SSL VPN gateway). After the SSL VPN device does all the processing, the unique IP address(es) are again converted to the original overlapped IP address(es). This solves the problem of multiple private networks with overlapped IP addresses being connected to one physical device. In addition, it would be desirable to maintain a map of the relations between the overlapped IP address, the logical SSL VPN device, the non-overlapped IP address (or unique IP address) and the VLAN tag for privacy within the VPN network.

It can be appreciated that the conversion of the overlapping IP address space of the private networks to a non-overlapping unique IP address space provides several advantages over the previous approaches, including only one Network Protocol stack is running on the operating system, the amount of changes required in the Network subsystem are minimal, there is centralized control of virtualization policies, and most third party libraries can be used in the virtualized model without changes. In addition, the approach is very scalable in terms memory and CPU usage as the number of virtual systems supported increases.

SUMMARY OF THE INVENTION

In accordance with one embodiment, a method of virtual routing an overlapping IP address using a virtual private network (VPN) device connected to a virtual private network (VLAN), the method comprising: receiving an overlapping Internet protocol (IP) address from a virtual site (a logical SSL VPN unit), the overlapping IP address having a virtual site address (Vsite) tag associated with a client; converting the overlapping IP address into a non-overlapping IP address; and converting the non-overlapping IP address into an overlapping IP address having a virtual local area network tag (Vlan), wherein the virtual local are network tag (Vlan) is associated with at least one local area network (LAN) within the virtual local area network (VLAN).

In accordance with a further embodiment, a system for virtual routing to a virtual private network (VLAN), which is comprised of a plurality of local area networks (LAN), the method comprising: a client; and a virtual private network (VPN) device, the VPN device having a virtual Network Address Translation (VNAT) layer configured to: receive an overlapping Internet protocol (IP) address from a virtual site, the overlapping IP address having a virtual site address tag (Vsite) associated with a client; convert the overlapping IP address into a non-overlapping IP address; convert the non-overlapping IP address into an overlapping IP address having a virtual local area network (Vlan) tag, wherein the virtual local are network tag (Vlan) is associated with at least one local area network (LAN); and direct the overlapping IP address to at least one desired local area network.

BRIEF DESCRIPTION OF THE DRAWINGS

The invention will now be described in greater detail with reference to the preferred embodiments illustrated in the accompanying drawings, in which like elements bear like reference numbers, and wherein.

DETAILED DESCRIPTION

Figure 1:
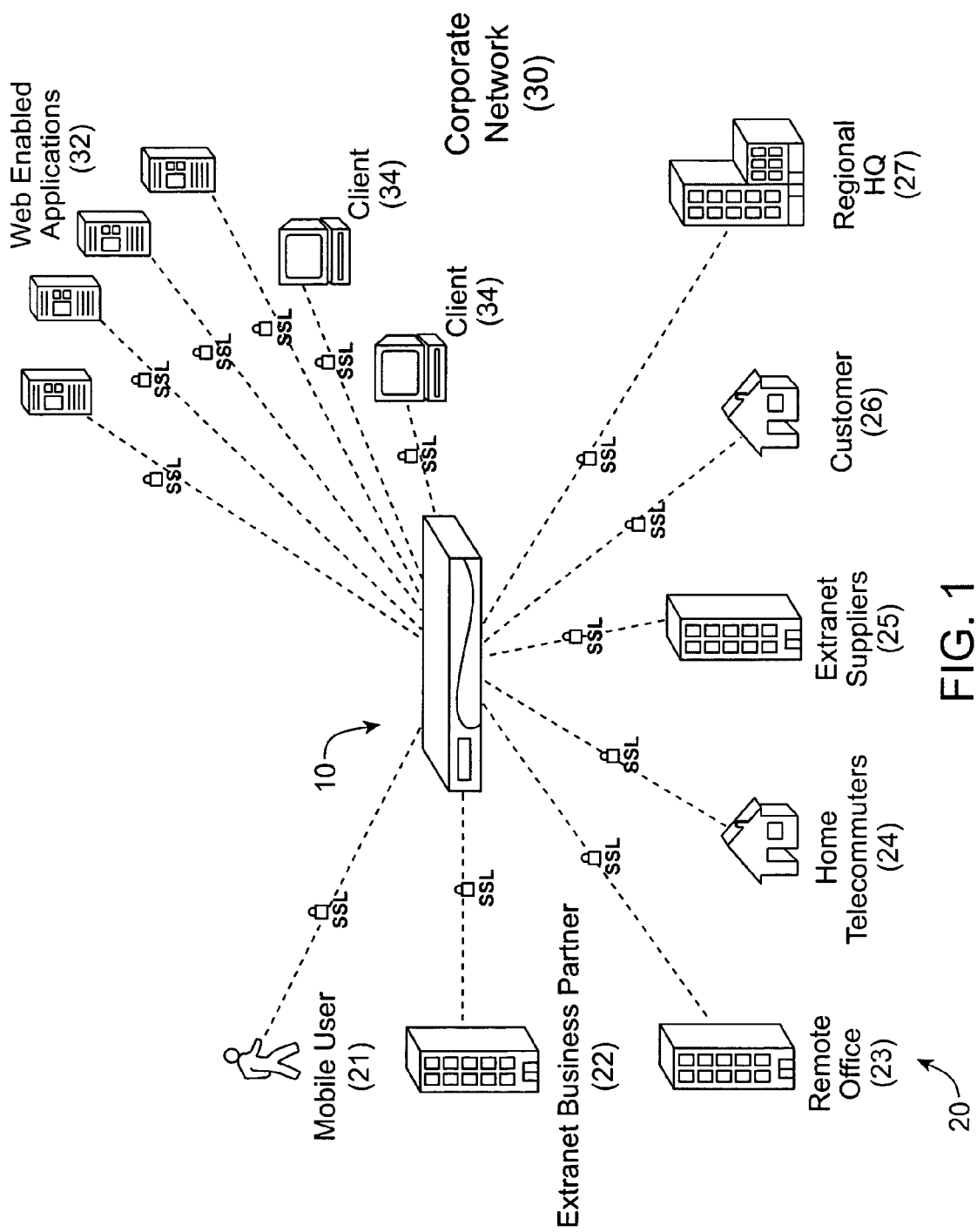
FIG. 1 shows a schematic diagram of a virtual private network (VPN) gateway in use according to one embodiment.

FIG. 1 shows a schematic diagram of a virtual private network (VPN) gateway or device 10 in accordance with one embodiment. As shown in FIG. 1, the VPN gateway or device 10 is configured to accommodate the needs of remote users or clients 20 to access web enabled applications 32 within a virtual Local Area Network (VLAN) 30. Typically, the VLAN 30 consists of a network of computers or local area networks (LAN) that behave as if connected to the same wire, even though they may actually physically connect to different segments of a local area network. In addition, network administrators can configure the VLANs 30 through software rather than hardware, which makes them extremely flexible, and when physically moving a computer to another location, the computer or LAN can stay on the same VLAN 30 without the need for any hardware reconfiguration.

The VPN device or gateway 10 is configure to prevent tampering with private resources by unauthorized users using an authentication, authorization and accounting/auditing system known as AAA. The VPN device 10 can also restrict and track the movement of data from inside the VPN device 10 to VLAN 30 and the LANs 122, 124 within the VLAN or other systems outside the VPN device 10. The operation of the VPN device is determined by security policies, as contained within the authentication and authorization server or an AAA server. The authentication and authorization (or AAA) servers are used for more secure access in a remote-access VPN environment. When a request to establish a session comes in from a client, the request is proxied to the authentication and authorization or (AAA) server.

As shown in FIG. 1, the remote users 20 can include mobile users 21, extranet business partners 22, remote offices 23, home telecommuters 24, extranet suppliers 25, customers 26, and regional headquarters 27, which are only some of the remote users 20 who may access the VLAN 30 via the virtual private network device 10. However, with the limited number of IP addresses, it is not uncommon for more than one virtual local area network (VLAN) 30, which is typically comprised of a plurality of local area networks (LAN) 122, 124 (FIG. 2) to have overlapping IP addresses 130 when accessed through a single VPN gateway 10.

Figure 2:
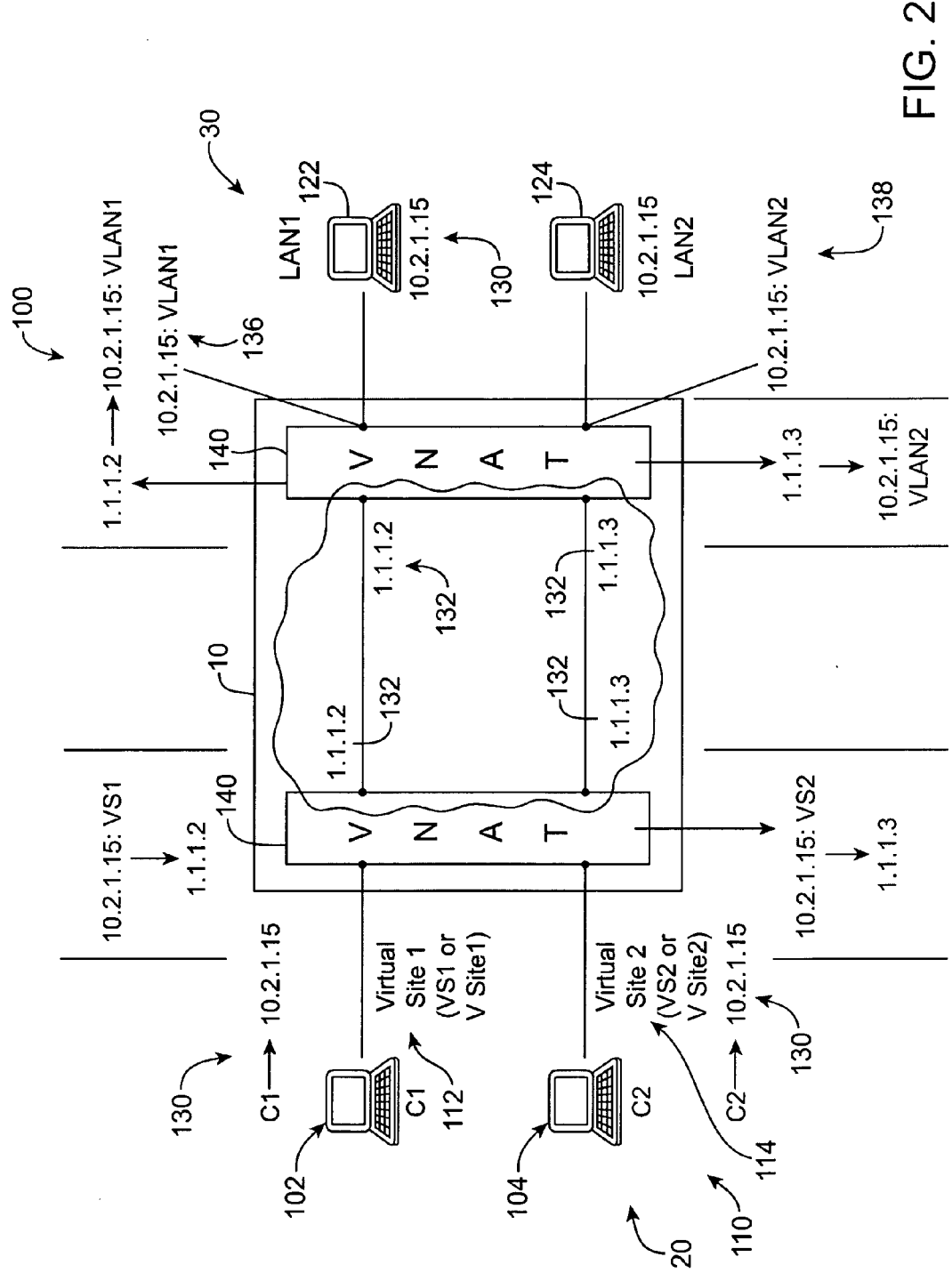
FIG. 2 shows a schematic diagram of a virtual private network gateway having virtual routing according to another embodiment.

FIG. 2 shows a schematic diagram of a VPN gateway 10 having virtual routing for virtual local area networks 30 (VLAN) with overlapping IP addresses 130 according to one embodiment. As shown in FIG. 2, a virtual LAN (local area network) aware NAT (Network Address Translation) system or VNAT system 100 can include one or more local area networks (LAN) 122, 124 having overlapping IP addresses 130, which are accessed through a single VPN gateway 10. The VPN gateway 10 includes a virtual Network Address Translation (VNAT) layer 140. The VNAT layer 140 is configured to convert the overlapping IP address 130 received from a client 110 into a non-overlapping IP address 132 (or unique IP address) upon receipt, so that the Internet protocols (IP) within a VPN gateway or device 10 are not affected. The VNAT layer 140 is preferably installed on the network layer (i.e., Layer 2) of the Internet protocol suite of the VPN gateway 10. Accordingly, upon receipt of the overlapping IP address 130, the VNAT layer 140 converts the overlapping IP address 130 into a non-overlapping IP address 132, so that the VPN gateway 10 sees only a non-overlapping IP address 132. The conversion to a non-overlapping IP address 132 allows the VPN gateway's Internet protocols including the TCP stack, routing and the regular NAT function of the VPN gateway 10 to function normally. Thus, the only portion of the VPN gateway 10 that is aware of the overlapping IP addresses 130 is the VNAT layer 140. It can be appreciated that, the VPN device or gateway 10 often refers to individual logical units within a VPN device or gateway 10 as "Virtual Sites" (or Vsite). A typical map would be:

Overlapped_IP1:Vsite1<->UniqueIP1<->OverlappedIP1:Vlan:tag1.

Overlapped_IP1:Vsite2<->UniqueIP2<->OverlappedIP1:Vlan:tag2.

The above mapping example illustrates that an SSL VPN gateway 10 can handle the overlapped IP addresses (duplicated in Vsite1 and Vsite2) without conflicts. In addition, the VPN device 10 or gateway can make sure traffic for Vsite1 can only flow though the LAN with Vlan:tag1, and Vsite2 traffic will only reach LAN with Vlan:tag2. Thus, the VNAT layer 140 can rewrite both source and destination IP addresses inside a packet. In contrast to a conventional NAT, which rewrites either the source IP address or the destination IP address depending on the direction of the traffic flow.

As shown in FIG. 2, each client 110 has a virtual site address tag (VS or Vsite) or subnet 112, 114 associated therewith. The packet from each of the clients 110 having an overlapping IP address 130 includes the virtual site address tag (or subnet) 112, 114 (Vsite1, Vsite2), which the VNAT layer 140 associates with each of the specific clients 110. The VNAT layer 140 associates the virtual site address tag 112, 114 (Vsite1, Vsite2) with the VLAN 30 and at least one of the LAN 122, 124 associated with the VLAN 30. It can be appreciated that the virtual site address tags 112, 114, can be configured to have to be associated with multiple LANs 122, 124 within a single VLAN 30.

Clients 110 can access web enabled applications and other resources on at least one of the plurality of LANs 122, 124, by sending a packet addressed to one of the LANs 122, 124 via the Internet (not shown) and the VPN gateway 10. The packet includes a virtual site address tag 112, 114 (Vsite1, Vsite2), which associates the packet with the originating virtual site 102, 104. The VPN gateway 10 receives the packet and the VNAT layer 140 translates the overlapping IP address 130 to a non-overlapping IP address 132. Upon receipt of the request, the VPN device or gateway 10 proxy's the request to the authentication and authorization or (AAA) server, wherein upon proper authentication, the VPN gateway 10 grants the client 110 access to the VLAN 30.

In addition, the VNAT layer 140 provides a mapping function, wherein the VNAT layer 140 returns a valid IP address 130 only if the Vsite tag 112, 114 in question has a virtual local area network tag (Vlan) 136, 138, (lan1, lan2), which contains a subnet holding the requested IP address 130 within the mapping function of the VNAT layer 140. In addition, it can be appreciated the traffic from a client 110 can travel to more than one LAN 122, 124. Accordingly, in an alternative embodiment, the VNAT layer 140 can be configured to have multiple Vlan tags 136, 138 per Vsite tag 112, 114. Thus, this allows Vsite tags 112, 114 to share a LAN 122, 124, which can contain common resources.

As shown in FIG. 2, a plurality of LANs 122, 124 associated with a VLAN 30 can have an overlapping IP address, such as 10.2.1.15. The client 110 having a virtual site address tag 112 (Vsite1) sends a packet addressed to the overlapping IP address 130 (10.2.1.15:Vsite1) with the virtual site address tag (Vsite) 112 attached thereto. The VNAT layer 140 receives the packet from the client 110, which is addressed to an overlapping IP address 130 (10.2.1.15:Vsite1) with a virtual site address tag (Vsite) 112. The VNAT layer 140 converts the overlapping IP address 130 (10.2.1.15:Vsite1) to a non-overlapping IP address 132 (1.1.1.2). Since the VPN gateway does not see the overlapping IP address 132 (1.1.1.2), the VPN gateway's protocols including the TCP stack, routing and the regular NAT function of the VPN gateway 10 functions normally, so that the VPN device 10 can grant the client 110 access to the VLAN 30. Thus, the only portion of the VPN gateway 10 that actually sees the overlapping IP address 130 (10.2.1.15:Vsite1) is the VNAT layer 140. The non-overlapping IP address 132 (1.1.1.2) is then converted by the VNAT layer 140 to an overlapping IP address with a virtual local area network tag (Vlan) 136 (10.2.1.15:lan1), which the VPN gateway 10 directs to the desired local area network (LAN1).

Alternatively, if the client 110 having a virtual address tag 114 (Vsite2) sends a packet addressed to overlapping IP address 130 (10.2.1.15:Vsite2) with virtual site address tag 114. The VNAT layer 140 converts the overlapping IP address 130 (10.2.1.15:Vsite2) to a non-overlapping IP address 132 (1.1.1.3). Since the VPN gateway 10 does not see the overlapping IP address 132 (1.1.1.3), the VPN gateway's protocols including the TCP stack, routing and the regular NAT function of the VPN gateway 10 function normally during the authentication, authorization and accounting process. Thus, the only portion of the VPN gateway 10 that actually sees the overlapping IP address 130 (10.2.1.15:Vsite2) is the VNAT layer 140. The non-overlapping IP address 132 (1.1.1.3) is then converted by the VNAT layer 140 to an overlapping IP address with a Vlan tag 138 (10.2.1.15:lan2), which the VPN gateway 10 directs to the desired local area network (LAN2).

It can be appreciated that the VNAT 140 layer is preferably implemented below the Network Layer of the Internet Protocol suite (i.e., Layer 2). In use, the VNAT layer 140 provides the VPN gateway 10 with the ability to continue functioning without changing any of the VPN's protocols. It can be appreciated that since the VPN protocols do not require any significant changes, the VNAT layer 140 acts like a hop in the network, which is implemented inside the VPN gateway 10. Thus, the VNAT layer 140 can perform the conversion from a "non-overlapping IP address" to an "overlapping IP address: Vlan", and from an "overlapping IP address:Vlan" to a "non-overlapping IP address", without the disadvantages seen in regular NAT systems.

For example, some of the advantages of the VNAT layer 140 can include only one instance of Network Protocol stack running on the operating system of the VPN gateway or device 10. In addition, it can be appreciated that by incorporating the VNAT layer 140 within the VPN gateway 10, and which does not require alterations or changes to the VPN's protocols, the VNAT layer 140 provides an approach, which is very scalable in terms memory and CPU usage. Thus, the VPN gateway 10 can support a large number of virtual systems and/or local area networks (VLAN) 30. It can also be appreciated that the amount of changes required in the VPN's network subsystem are only minimal, the VPN gateway 10 can have centralized control of virtualization policies, and most third party libraries can be used in the virtualized model without changes.

In addition, since the VPN gateway 10 only sees the non-overlapping IP addresses 132, the TCP stack, routing and regular NAT on the VPN gateway 10 can function as normal with only the VNAT layer 140 seeing the overlapping IP addresses 130. In addition, the VNAT layer 140 provides network-to-network mapping so that the VPN gateway 10 does not have be concerned with TCP/UDP port management. The VNAT layer 140 provides a very simple stateless map function, since the VNAT layer 140 is completely isolated from the rest of the VPN gateway 10, and the VNAT layer 140 can also be configured to be turned on and off without affecting the rest of the VPN 10 system. The VNAT layer 140 can also be configured so that the Internet Service Provider (ISP) uses a tagged VLAN switch.

Figure 3:
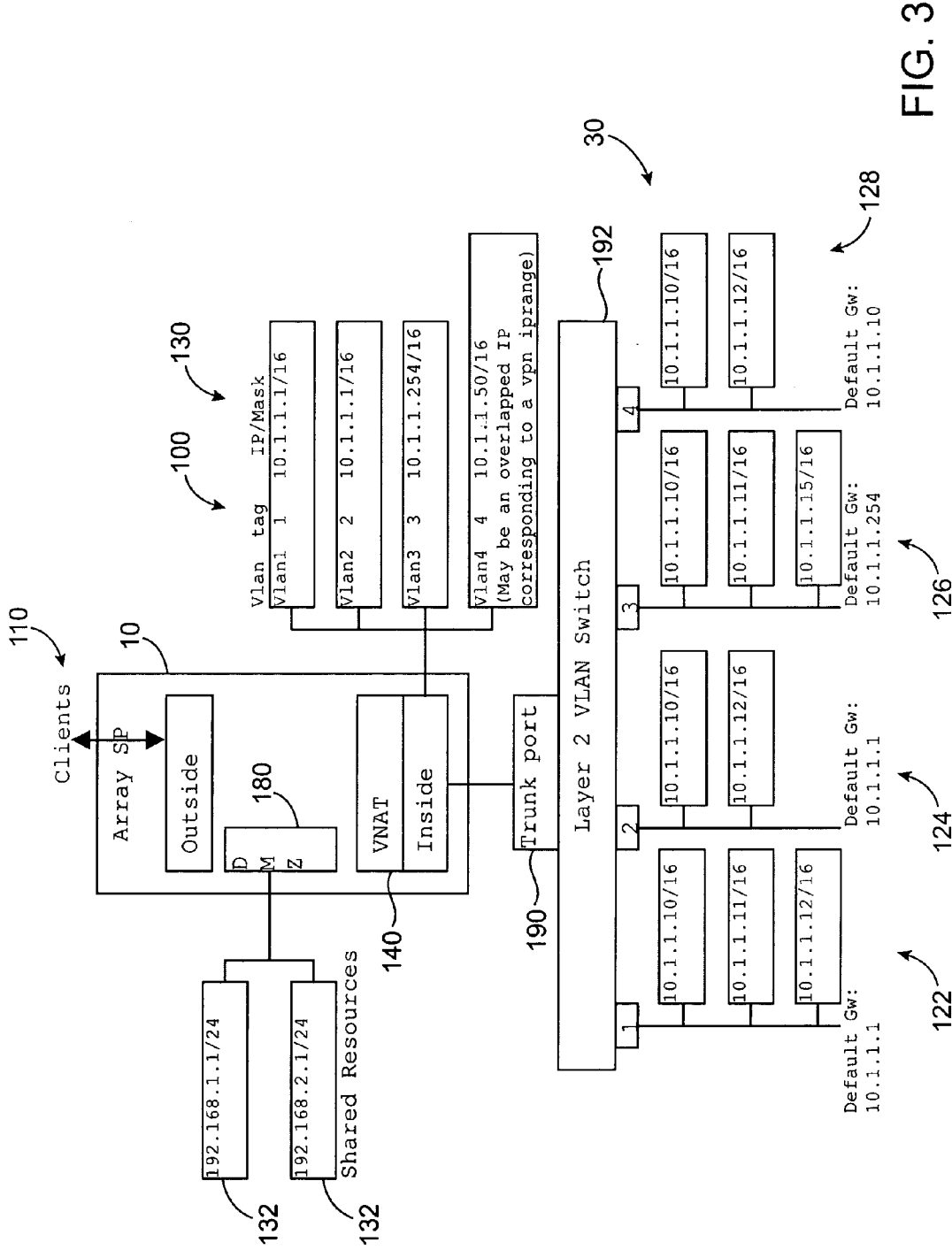
FIG. 3 shows a schematic diagram of a virtual private network (VPN) gateway in use according to another embodiment.

FIG. 3 shows a schematic diagram of a VPN gateway 10 having virtual routing for virtual local area networks 30

(VLAN) with overlapping IP addresses 130 according to another embodiment. As shown in FIG. 3, the virtual LAN (local area network) aware NAT (Network Address Translation) system or VNAT system 100 can include one or more local area networks (LAN) 122, 124, 126, 128 having overlapping IP addresses 130, which are accessed through a single VPN gateway 10. The VPN gateway 10 includes a virtual Network Address Translation (VNAT) layer 140, a trunk port 190, a Layer 2 VLAN switch 192 and a plurality of LANs 122, 124, 126, 128. The VNAT layer 140 is configured to convert the overlapping IP address 130 received from a client 110 into a non-overlapping IP address 132 upon receipt, so that the Internet protocols (IP) within the VPN gateway or device 10 are not affected in a demilitarized zone (DMZ) 180 of the VPN gateway 10. The demilitarized zone (DMZ) 180, or perimeter network, which sits between the client 110 and the Internet or external network and the VLAN 30 (or internal network) and is configured to permit connections from the VLAN 30 (internal network) and the client 110 via an external network to the DMZ 180. However, connections from the DMZ 180 are only permitted to the external network, such that hosts in the DMZ 180 may not connect to the internal network. This allows the DMZ's hosts to provide services to the external network while protecting the internal network in case intruders compromise a host in the DMZ. For someone on the external network who wants to illegally connect to the internal network, the DMZ is a dead end. It can be appreciated that a DMZ 180 can be used for connecting servers that need to be accessible from the outside world, such as e-mail, web and DNS servers.

The VNAT layer 140 is preferably installed on the network layer (i.e., Layer 2) of the Internet protocol suite of the VPN gateway 10. Accordingly, upon receipt of the overlapping IP address 130, the VNAT layer 140 converts the overlapping IP address 130 into a non-overlapping IP address 132, so that the VPN gateway 10 sees only a non-overlapping IP address 132. The conversion to a non-overlapping IP address 132 allows the VPN gateway's Internet protocols including the TCP stack, routing and the regular NAT function of the VPN gateway 10 to function normally. Thus, the only portion of the VPN gateway 10 that is aware of the overlapping IP addresses 130 is the VNAT layer 140.

As shown in FIG. 3, the packet from each of the clients 110 having an overlapping IP address 130 includes the virtual site address tag (or subnet), which the VNAT layer 140 associates with each of the specific clients 110. The VNAT layer 140 associates the virtual site address tag with the VLAN 30 and at least one of the LAN 122, 124, 126, 128 associated with the VLAN 30. It can be appreciated that the virtual site address tags can be configured to have to be associated with multiple LANs 122, 124, 126, 128 within a single VLAN 30. It can be appreciated that any suitable trunk port 190 or port device, and switch 192 can be used to direct the packets to the associated LAN 30. As shown, the VPN gateway 10 receives the packet and the VNAT layer 140 translates the overlapping IP address 130 to a non-overlapping IP address 132. Upon receipt of the request, the VPN device or gateway 10 proxy's the request to the authentication and authorization or (AAA) server (not shown), wherein upon proper authentication, the VPN gateway 10 grants the client 110 access to the VLAN 30. In use, the VNAT layer 140 provides the VPN gateway 10 with the ability to continue functioning without changing any of the VPN's protocols. It can be appreciated that since the VPN protocols do not require any significant changes, the VNAT layer 140 acts like a hop in the network, which is implemented inside the VPN gateway 10. Thus, the VNAT layer 140 can perform the conversion from a "non-overlapping IP address" to an "overlapping IP address:Vlan", and from an "overlapping IP address:Vlan" to a "non-overlapping IP address", without the disadvantages seen in regular NAT systems.

Figure 4:
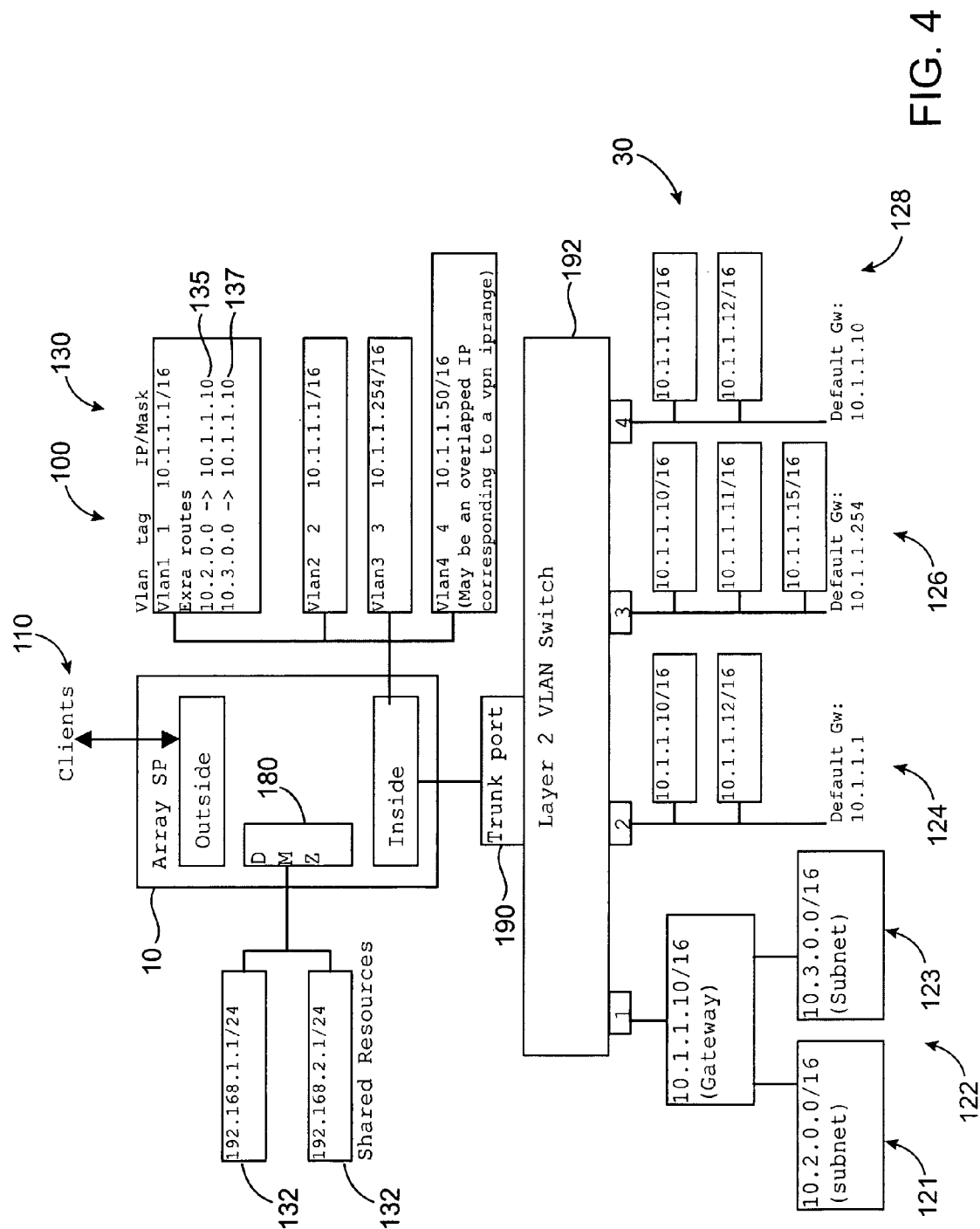
FIG. 4 shows a schematic diagram of a virtual private network (VPN) gateway having virtual routing according to a further embodiment with a VLAN having multiple subnets.

FIG. 4 shows a schematic diagram of a virtual private network gateway 10 having virtual routing according to a further embodiment with multiple subnets 121, 123 within a LAN 122. As shown in FIG. 4, the virtual LAN (local area network) aware NAT (Network Address Translation) system or VNAT system 100 can include one or more local area networks (LAN) 122, 124, 126, 128 having overlapping IP addresses 130, which are accessed through a single VPN gateway 10. The VPN gateway 10 includes a virtual Network Address Translation (VNAT) layer 140, a trunk port 190, a Layer 2 VLAN switch 192 and a plurality of LANs 122, 124, 126, 128. The VNAT layer 140 converts the overlapping IP address 130 received from a client 110 into a non-overlapping IP address 132, so that the Internet protocols (IP) within the VPN gateway or device 10 are not affected in a demilitarized zone (DMZ) 180 of the VPN gateway 10. As shown in FIG. 4, the LAN 122 can include a subnet 121, 123 within the LAN 122. Accordingly, upon receipt of the packet from the client 110, the VNAT layer 140 translates the overlapping IP address 130 to a non-overlapping IP address 132 with a Vlan tag 135, 137 corresponding to the LAN 122 and the subnet 121, 123 associated therewith.

Figure 5:
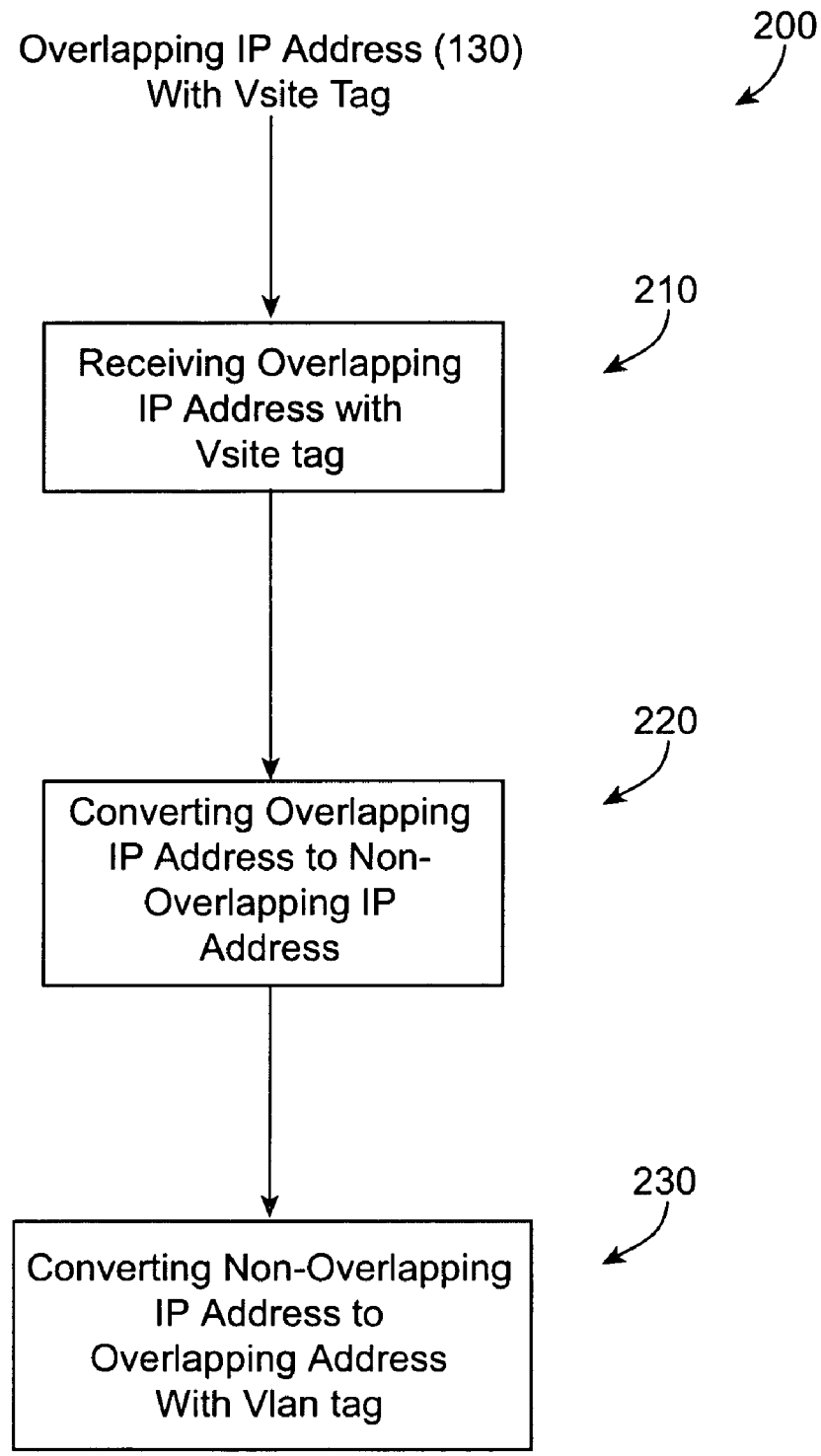
FIG. 5 shows a flow chart of the virtual private network gateway having virtual routing according to another embodiment.

FIG. 5 shows a flow chart for a virtual private network gateway 10 having virtual routing in accordance with a further embodiment. As shown in FIG. 3, the functional aspects of the VNAT layer 140 include mapping functions to convert the overlapped IP addresses 130 into non-overlapped IP addresses 132 and vice-a-versa. The method 200 of virtual routing an overlapping IP address using a virtual private network (VPN) device connected to a virtual private network (VLAN) includes receiving an overlapping Internet protocol (IP) address 202 from a virtual site, the overlapping IP address having a virtual site address tag (Vsite) associated with a client 210. The VNAT layer 140 converts the overlapping IP address into a non-overlapping IP address 220. Once the VPN device has proxied the request to an authentication and authorization server for authentication and authorization of the client to access the VLAN 30, the VNAT layer 140 converts the non-overlapping IP address into an overlapping IP address having a virtual local area network tag (Vlan). The virtual local are network tag (Vlan) is associated with at least one local area network (LAN) within the virtual private network 230.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method of virtual routing an overlapping IP address for a virtual private network (VPN) device connected to a virtual local area network (VLAN) without affecting Internet protocol (IP) processing within the VPN device, the method comprising:

receiving on the VPN device, a packet with an overlapping Internet protocol (IP) address from a virtual site, the overlapping IP address having a virtual site tag associated with it;

converting the overlapping IP address into a non-overlapping unique IP address by a virtual network address layer (VNAT) upon reception, so that Internet Protocol (IP) processing within the VPN device is not affected in a demilitarized zone of the VPN device;

performing internet protocol processing within the VPN device on the packet using the non-overlapping unique IP address;

converting the non-overlapping unique IP address back to the overlapping IP address having a virtual local area network tag by a virtual LAN (local area network) aware NAT (Network Address Translaton) layer within the VPN device to provide a mapping function, and wherein the mapping function returns a valid IP address only if the virtual site address tag in question has a local area network tag, which contains a subnet holding the requested IP address; and forwarding the packet with the overlapping IP address with the virtual local area network tag to at least one local area network (LAN).

2. The method of claim 1, wherein converting the overlapping IP address into a non-overlapping unique IP address is performed by a virtual LAN (local area network) aware NAT (Network Address Translation) layer within the VPN device.

3. The method of claim 1, further comprising a plurality of clients, the plurality of clients each having a virtual site address tag associated therewith.

4. The method of claim 1, further comprising a plurality of local area networks, the plurality of local area networks each having a virtual local address tag associated therewith.

5. The method of claim 1, further comprising forwarding a request to establish a session with the VPN device from the client to an authentication and authorization server within the VPN device for authentication and authorization of the client to access the VLAN.

6. A system for virtual routing to a virtual private network (VLAN), which is comprised of a plurality of local area networks (LAN), the system comprising:

a client; and a virtual private network (VPN) device, the VPN device having a virtual Network Address Translation (VNAT) layer configured to:

receive a packet with an overlapping Internet protocol (IP) address from a client, the overlapping IP address having a virtual site address tag associated with it;

convert the overlapping IP address into a non-overlapping unique IP address by a virtual network address layer (VNAT) upon reception, so that Internet Protocol (IP) processing within the VPN device is not affected in a demilitarized zone of the VPN device;

perform internet processing protocol within the VPN device on the packet using the non-overlapping unique IP address;

convert the non-overlapping unique IP address back to the overlapping IP address having a virtual local area network tag by a virtual LAN (local area network) aware NAT (Network Address Translation) layer within the VPN device to provide a mapping function, and wherein the mapping function returns a valid IP address only if the virtual site address tag in question has a local area network tag, which contains a subnet holding the requested IP address, wherein the virtual local area network tag is associated with at least one local area network (LAN); and direct the packet with the overlapping IP address having a virtual local area network tag to at least one local area network.

7. The system of claim 6, wherein the client further comprises a plurality of clients, the plurality of clients each having a virtual site address tag associated therewith.

8. The system of claim 6, wherein the VPN device directs the overlapping IP address to at least one local area network.

9. The system of claim 6, wherein the VPN device directs the overlapping IP address to at least two local area networks.

10. The system of claim 6, further comprising a virtual local area network, and wherein the virtual local area network comprising a plurality of local area networks.

* * * * *